Figure 1:
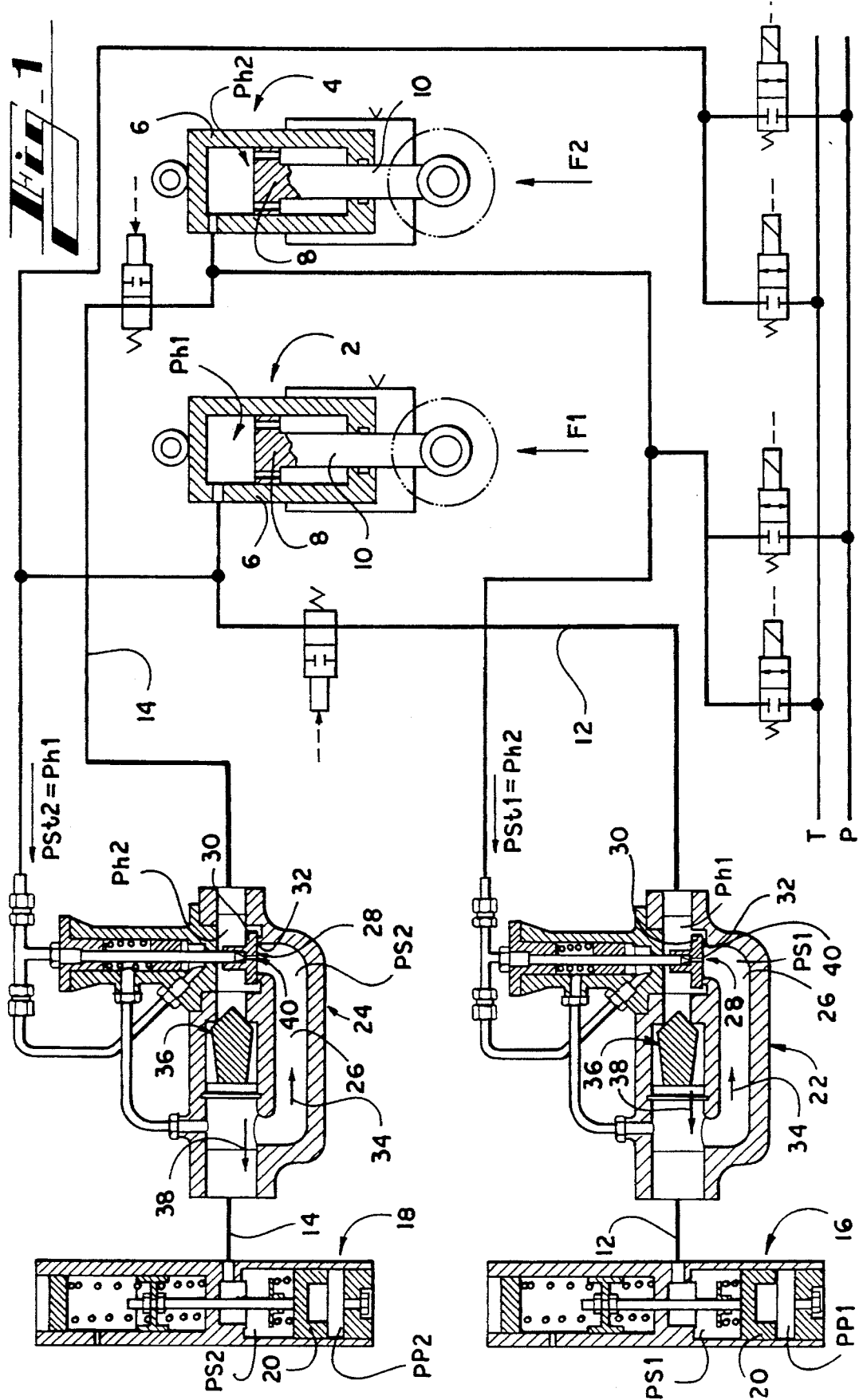

United States Patent
Runkel

[11] Patent Number: 5,458,218
[45] Date of Patent: Oct. 17, 1995

[54] SUSPENSION SYSTEM FOR MOTOR VEHICLES AS WELL AS DAMPING VALVE FOR SAID SUSPENSION SYSTEM

[75] Inventor: Walter Runkel, Wuppertal, Germany

[73] Assignee: Hemscheidt Fahrwerktechnik GmbH & Co. KG, Wuppertal, Germany

[21] Appl. No.: 166,979

[22] Filed: Dec. 14, 1993

[30] Foreign Application Priority Data

Dec. 16, 1992 [DE] Germany .......................... 42 42 534.4
Apr. 29, 1993 [DE] Germany .......................... 43 14 021.1

[51] Int. Cl.[6] ............................................. F16F 9/50
[52] U.S. Cl. ..................... 188/281; 188/314; 188/318; 188/322.13; 267/64.25; 137/110; 137/493.7; 280/714
[58] Field of Search ................................ 188/314, 318, 188/322.13, 322.14, 294, 279, 281; 267/64.15, 64.16, 64.17, 64.25; 137/110, 493.7, 493, 599.2; 280/707, 714

[56] References Cited

U.S. PATENT DOCUMENTS

| | | | |
|---|---|---|---|
| 4,153,237 | 5/1979 | Supalla | 188/314 X |
| 4,732,244 | 3/1988 | Verkuylen | 188/318 |
| 5,052,433 | 10/1991 | Levenez | 137/599.2 X |
| 5,147,018 | 9/1992 | Kobori et al. | 188/322.13 |
| 5,239,471 | 8/1993 | Takahashi | 280/714 X |

FOREIGN PATENT DOCUMENTS

| | | |
|---|---|---|
| 3719113C1 | 8/1992 | Germany . |
| 4117455A1 | 12/1992 | Germany . |
| 2234041 | 1/1991 | United Kingdom ............ 188/318 |

*Primary Examiner*—Robert J. Oberleitner
*Assistant Examiner*—Lee W. Young
*Attorney, Agent, or Firm*—Jones & Askew

[57] ABSTRACT

A suspension system with at least one hydraulic spring strut. At least a portion of the hydraulic medium is displaced into a hydropneumatic spring reservoir during the compression movement of the spring strut, and that portion of the hydraulic medium flows back into the spring strut during the expansion movement. At least the expansion flow is conveyed through the flow path of a damping valve and damped due to the fact that the flow path is continuously closed and reopened in an alternating fashion by means of a valve element once a expansion flow is present. The valve element is bypassed via a bypass which is constructed in such a way that a pressure compensation between the sections of the flow path arranged on both sides of the valve element is ensured in the static condition in which essentially no flow is present; and that the bypass essentially loses this pressure compensation function in the dynamic condition in which a flow is present.

25 Claims, 4 Drawing Sheets

FIG_2

FIG_3

SUSPENSION SYSTEM FOR MOTOR VEHICLES AS WELL AS DAMPING VALVE FOR SAID SUSPENSION SYSTEM

The invention pertains to a suspension system, in particular a wheel suspension system for motor vehicles, with at least one hydraulic spring strut that consists of a cylinder and a piston that is guided inside the cylinder in a movable fashion in order to facilitate the compression and expansion movement of the strut, whereby at least a portion of the hydraulic medium is displaced into a hydropneumatic spring reservoir during the compression movement of the spring strut, and said hydraulic medium flows back into the spring strut during the expansion movement; and whereby at least the expansion flow of the spring strut is conveyed through the flow path of a damping valve and damped due to the fact that the flow path is continuously closed and reopened in an alternating fashion by means of a valve element once an expansion flow is present.

The invention also pertains to a damping valve, in particular a damping valve to be used in connection with the aforementioned suspension system, with a valve element that is arranged in the flow path for a hydraulic medium and constructed in such a way that the flow path is continuously closed and reopened in an alternating fashion by the valve element, while a flow of the hydraulic medium is present in order to produce a damping effect.

A hydraulic flow is usually conveyed through a throttle in order to damp said flow, whereby whirls and turbulence are in accordance with the "flow resistance principle," intentionally produced in the flow to be damped. However, this leads to a very disadvantageous heating of the hydraulic medium, particularly in hydropneumatic systems, because the heat is transferred to the pneumatic medium that determines the spring effect, so that the spring characteristics and thus the respective level of the vehicle may be altered. It is even possible that the turbulence leads to damaging erosion phenomena in the throttling area, in particular at high flow velocities (rapid spring movements of the respective spring strut).

European Patent No. 0,515,991 disclosed a suspension system and a damping valve of this type, whereby a "damping effect" is (different from the thus far used damping or throttling principle with the formation of whirls and turbulence) produced by means of a controlled, metered, and successive "relaxation" of the hydraulic medium. This results in a "chronological extension" of the expansion process with otherwise evenly maintained energy; a time-delayed pressure and energy degradation occurs due to the fact that the energy stored during the compression movement is released "in portions" during the subsequent expansion movement such that a reduction of the spring force in the expansion direction, and thus a quasi "damping effect" is obtained. A certain volume of the hydraulic medium is stored in the spring strut when the flow path is closed, and a rapid pressure drop in comparison to the pressure of the spring strut occurs due to a minute expansion. This pressure differential is, according to a preferred variation of the known system, used to control the alternating closing and opening of the connection between the spring strut and the spring reservoir in a practically automated fashion. The valve element acts as a type of nonreturn valve, because it is actuated in the closing direction by the hydraulic pressure of the spring strut as well as an additional, elastic prestress force, and actuated in the opening direction with the hydraulic pressure of the spring reservoir. This means that the valve element closes automatically if an equilibrium of pressure or even a very minute pressure differential exists; and that the valve element opens the flow path if the pressure differential increases, in other words once a certain differential, in particular a preadjustable differential, has been reached.

This known suspension system has essentially proven itself in practical applications. In particular, this system prevents a damaging and rapid "recoiling" of the vehicle wheels in the expansion direction. A sufficient stabilization of the motor vehicle against lateral tilting (tilting around the longitudinal axis of the motor vehicle, for example, while driving around curves) may be obtained by additionally prestressing the valve element with a hydraulic control pressure in the closing direction, whereby the hydraulic pressure of the second spring strut arranged on the opposite side of the motor vehicle is used as the control pressure. A "tilting" of the motor vehicle is effectively prevented by this measure. However, it was established that a motor vehicle equipped with this known system, in many instances, still has quite a "hard" and uncomfortable suspension behavior.

Originating from the aforementioned state of the art, the invention is based on the objective of introducing a suspension system that substantially increases the suspension comfort while maintaining a good damping effect and, in particular, the possibility of an effective vehicle stabilization. An additional objective of the invention is to disclose a corresponding damping valve to be used in the aforementioned suspension system.

According to the invention, this objective is attained by a bypass that bypasses the valve element of the damping valve and is constructed in such a way that it ensures a pressure compensation between the sections of the flow path arranged on both sides of the valve element in a static condition in which essentially no flow is present; and that the bypass essentially loses this pressure compensation function in a dynamic condition in which a flow is present.

The invention is based on the idea that a certain pressure differential frequently remains after the expansion movement, which means, in other words, after the expansion flow has ceased, due to the "pressure differential control" of the damping valve element of the known suspension system. This remaining pressure differential must at first be overcome during a subsequent compression movement before a nonreturn valve, which opens while a compression flow is present and is switched in parallel with the expansion flow path, may open. This results in a "hard" spring movement in the compression direction that in turn manifests itself in the fact that the passengers sitting in the motor vehicle are frequently exposed to quite hard shocks. It was also established that certain problems may occur, in particular while prestressing each valve with the hydraulic pressure of the respectively opposing spring strut to obtain the stabilization against tilting, because a load unevenly distributed on both sides of the motor vehicle also leads to different suspension characteristics on both sides of the motor vehicle. If the load on the right side is, for example, higher than the load on the left side, the damping valve on the left side is prestressed more intensely than the one on the right side; the result is that the suspension is "harder" on the left side than on the right side.

This invention facilitates that the two pressures charging the damping valve element may always compensate each other via the bypass in a static condition such that no pressure differential has to be overcome during a subsequent compression movement; a very "soft" and comfortable spring movement is ensured. However, once an expansion flow is present, the bypass according to the invention acts as if it would be closed. This may be attained because the bypass has a small flow cross section such that it generates a high flow resistance practically identical to a closing of the bypass. According to a particularly preferred variation of the invention, the bypass is inevitably opened or closed by a locking device controlled in accordance with the respective flow and/or pressure ratios.

A preferred variation of the invention suggests a locking tappet for this purpose, whereby said locking tappet cooperates with the bypass that is constructed as a through-hole in the expansion valve element or with the outlet opening of the aforementioned through-hole in a valve-like fashion in order to close and open the bypass, namely via a valve collet-type end. Since this end is arranged in that particular section of the flow path in that the hydraulic pressure of the spring strut is present, the locking tappet is actuated with a force which has the tendency to move the same away from the valve element into a position in which it opens the bypass. The locking tappet is on its opposite side, preferably charged with a control pressure such that an opposing force component that acts in the closing direction is produced. The hydraulic pressure of a spring strut arranged on the opposite side of the motor vehicle is preferably used as the control pressure. A pressure compensation is preferably provided in order to prevent an undesirable reaction of the locking device from occurring at pressure differentials which solely depend on the respective load. In order to attain the aforementioned pressure compensation, an annular piston which encloses the locking tappet like a sleeve may be provided, whereby said annular piston influences the locking tappet to compensate the pressure by actuating its two opposing annular surfaces with a special pressure as well as the thus obtained limiting positions. However, an undesirable opening of the bypass may with this particular variation occur under certain operating conditions, which means that the expansion valve element lacks the prestress force component and may thus not optimally stabilize the motor vehicle.

An additional improvement to insure a reliable function under all operating conditions with particularly simple constructive means may be attained by a differential piston according to the invention which practically represents a "one-piece combination" of the locking tappet and the annular piston according to the previously described variation. This measure makes it possible to simplify the device in regard to constructive considerations, in particular due to the fact that sealing elements are omitted. A differential piston may be designed particularly simply in regard to its surfaces acted on by pressures, because the one-piece construction of the differential piston makes it very easy to determine an axial force by the sum of all partial forces obtained from the product of "pressure times surface acted on by this pressure."

Preferably, the suspension system according to the invention also provides a stabilization against lateral tilting by the interaction of two respective spring struts, whereby the control is again performed by means of the hydraulic pressure of the respectively opposing spring strut which is used as the control pressure. However, the invention suggests a static pressure compensation such that optimal and comfortable suspension characteristics are ensured if an uneven load distribution exists on both sides of the motor vehicle. This pressure compensation is realized because the stabilization only becomes effective once the prestress of the respectively opposing damping valve is increased during dynamic processes, i.e., dynamic changes of the respective hydraulic pressure on one of the two sides of the motor vehicle. This aspect will be described in detail at a later point in this text with the aid of a preferred application example.

The subclaims that are dependent on the respective main claim or secondary claim and the following description disclose advantageous constructive characteristics and variations of the invention.

Figure 2:
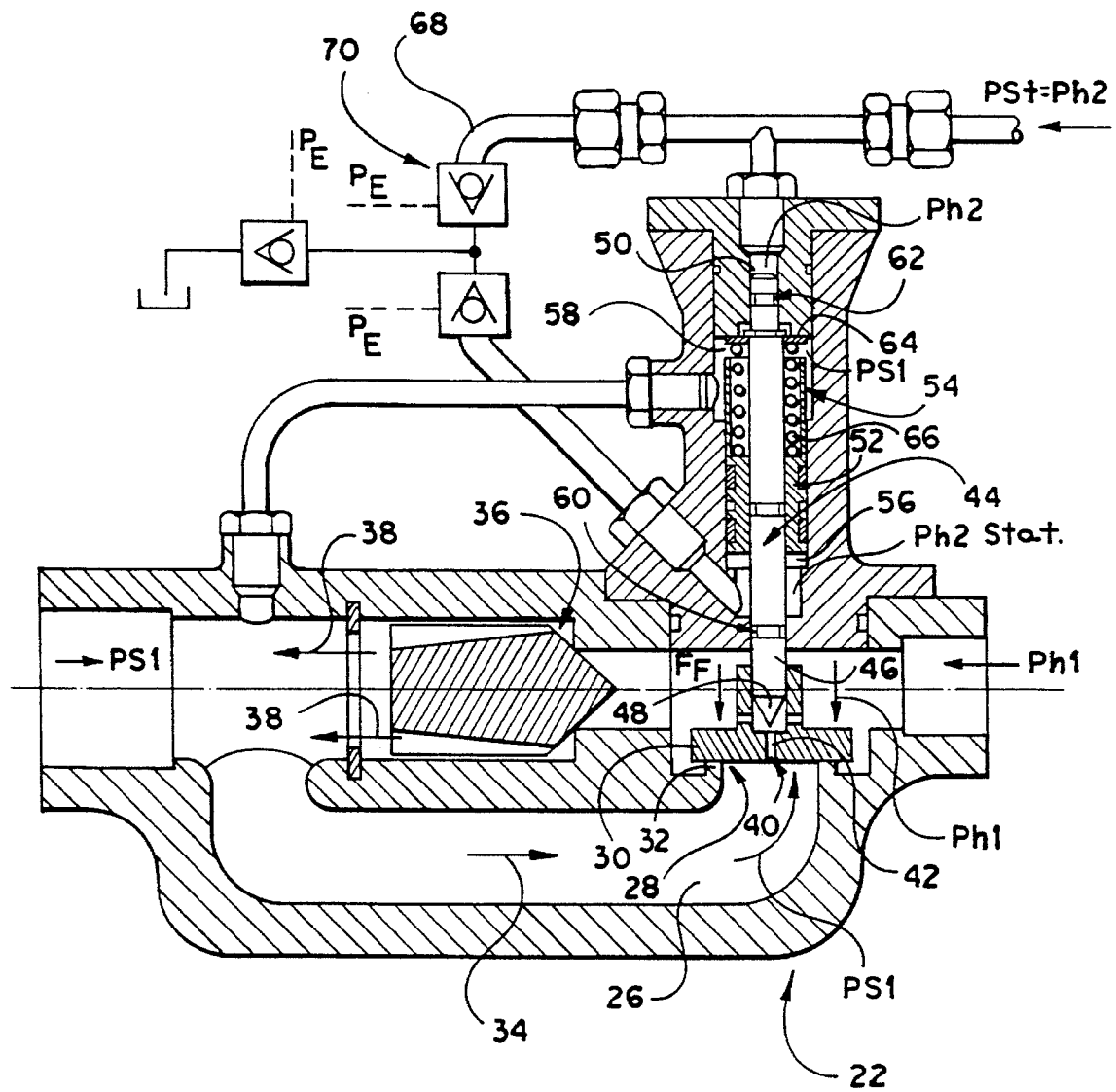
Figure 3:
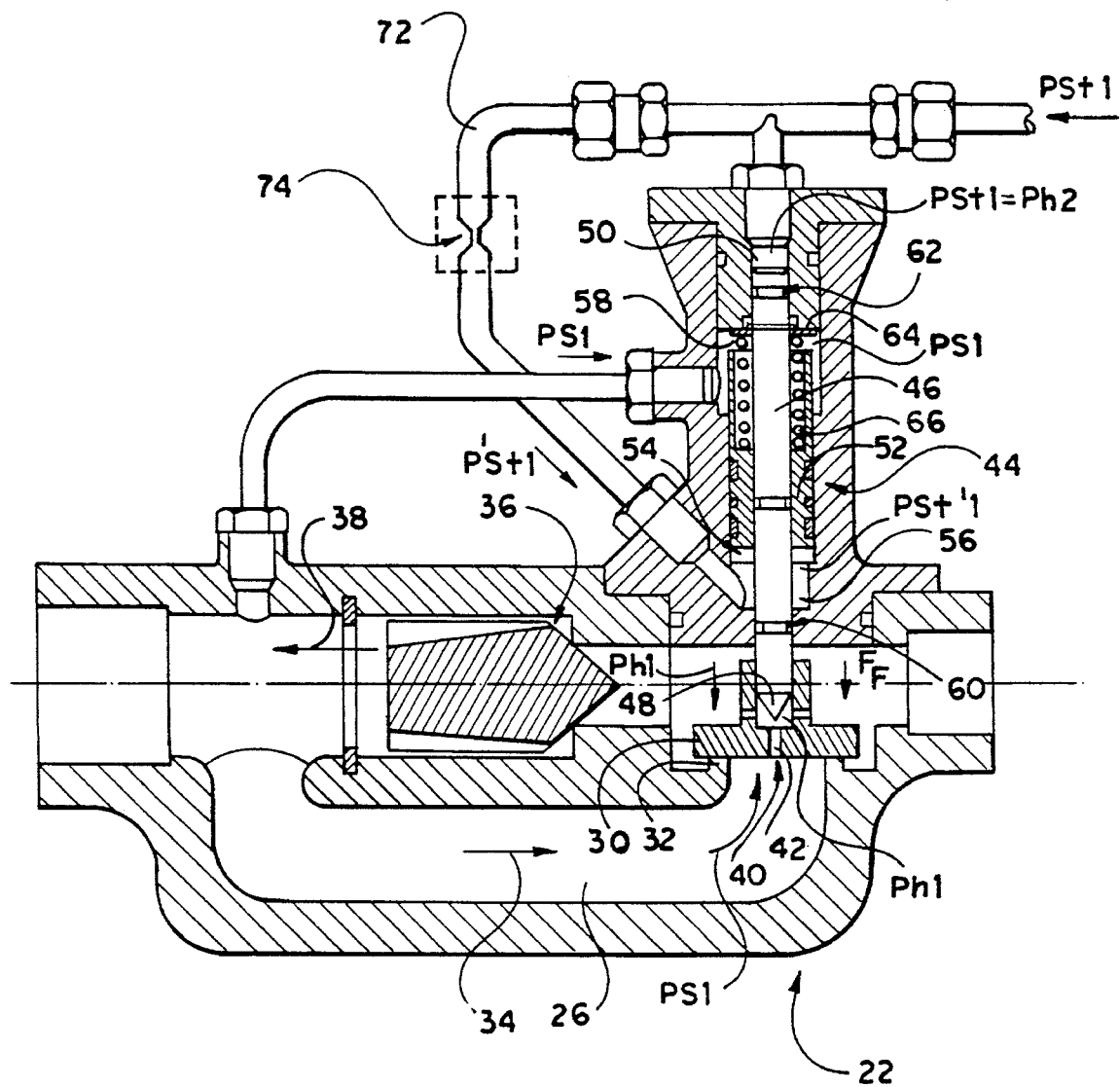
Figure 4:
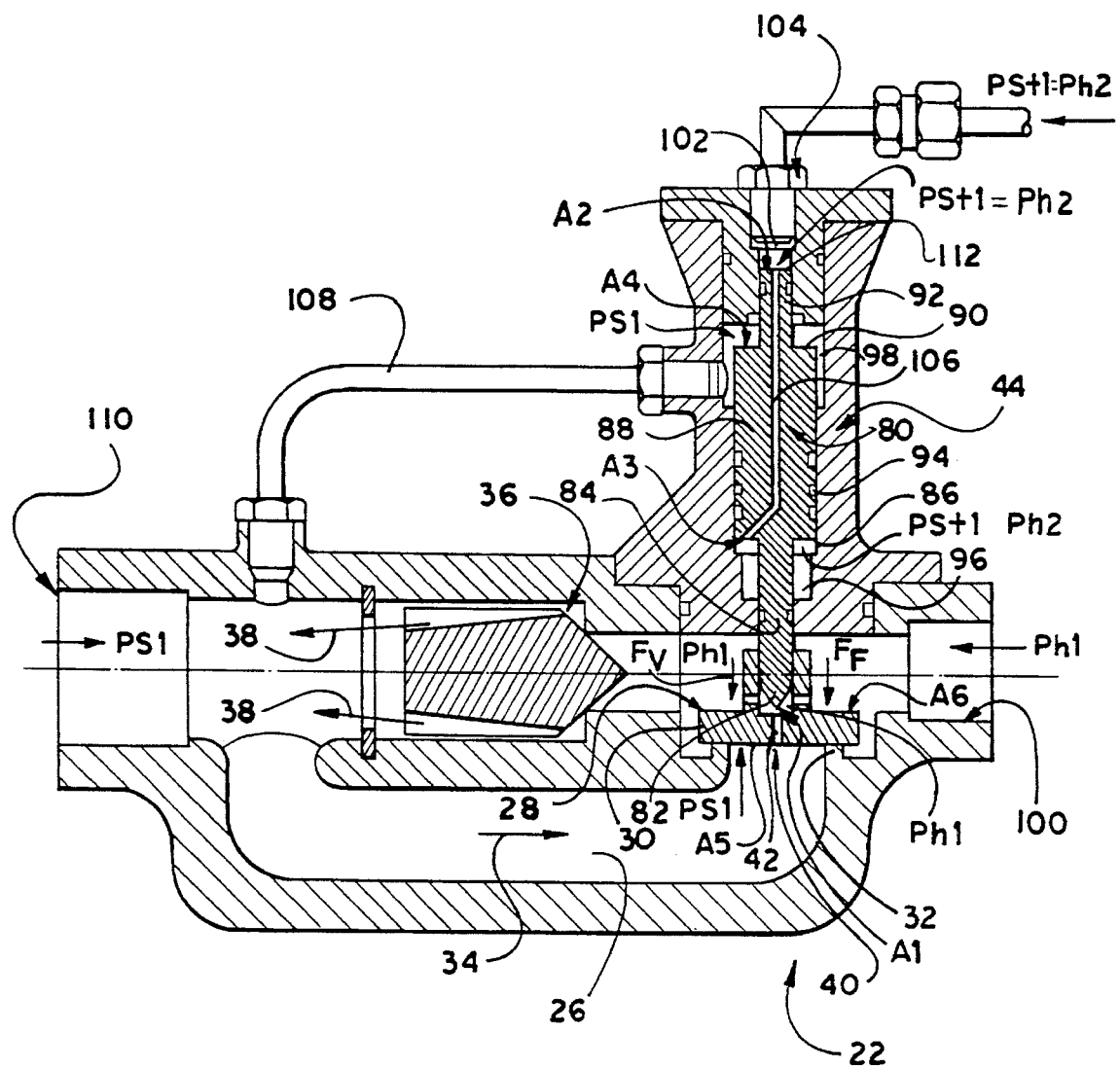

The invention is, in the following, described in detail with the aid of the figures. The figures show:

FIG. 1: a preferred application example of a suspension system according to the invention with two spring struts which are assigned to a vehicle axle and arranged on opposite sides of the vehicle as well as the respective spring reservoirs and damping valves, whereby the individual components are all illustrated in schematic and simplified longitudinal sections;

FIG. 2: an illustration of one of the two damping valves in an enlarged representation as compared to FIG. 1;

FIG. 3: an illustration analogous to FIG. 2, however in a different variation; and FIG. 4: an additional preferred application example of a damping valve according to the invention in a representation analogous to FIGS. 2 and/or 3.

Identical parts and components in all figures are identified by the same reference numerals, so that each description of a part that appears only once in the text also applies to the other figures in which this part is also identified with the corresponding reference numeral.

Two hydraulic spring struts 2, 4 are provided in the preferred application example of a suspension system according to the invention illustrated in FIG. 1, whereby each of said spring struts is assigned to one wheel of a vehicle axle and thus arranged on opposite sides of a motor vehicle (on the left and the right). Each spring strut 2, 4 consists of a cylinder 6 and a piston 8 which is guided inside said cylinder in a movable fashion in order to facilitate the compression and expansion movements of the spring strut. The piston is connected with a piston rod 10 that extends out of the cylinder 6 in a sealed fashion. The spring struts 2, 4 with the cylinder 6 and the piston rod 10 are, in a conventional fashion, arranged between a nonspring-mounted mass (motor vehicle wheel/axis) and a spring-mounted mass (vehicle frame/chassis).

Each spring strut 2, 4 contains a hydraulic medium which is under hydraulic pressure $p_{h1}$ or $p_{h2}$ due to the equilibrium between the forces F1 or F2 stressing each of the spring struts 2 and 4. Each of the spring struts 2, 4 is connected with a preferably hydropneumatic spring reservoir 16 or 18 via a hydraulic connection 12 or 14. A compressible medium that is prestressed with a pneumatic prestress pressure $p_{P1}$ or $p_{P2}$ acts against the hydraulic medium in each spring reservoir 16, 18, in particular, via a separating piston 20 guided in a freely movable fashion, such that the hydraulic medium is under a hydraulic spring reservoir pressure $p_{s1}$ or $p_{s2}$. The hydraulic pressure in the spring strut is, in static condition, identical to the respective hydraulic spring reservoir pressure.

A damping valve 22 or 24 is arranged in the respective connection 12, 14 between each spring strut 2, 4 and its spring reservoir 16, 18 (see also FIG. 2). A flow path 26 for an expansion flow from the spring reservoir to the spring strut is formed in each damping valve 22, 24, whereby a nonreturn valve-like expansion valve 28, with a valve element 30 and a valve seat 32, is arranged in the aforementioned flow path in such a way that the flow path 26 is continuously closed and reopened in an alternating fashion by the valve element 30 once an expansion flow is present (direction of arrow 34). The expansion valve 28 closes once an opposing compression flow is present; this compression flow is then conveyed through a nonreturn valve 36 which is hydraulically switched in parallel and acts in the opposite direction (direction of arrow 38).

The valve element 30 is preferably constructed or arranged in such a way that it automatically "controls" the flow path 26, which means that the valve element continuously closes and opens the flow path in an alternating fashion without external actuation. FIG. 2, in particular, shows that the valve element 30 is actuated in the opening direction with the hydraulic pressure $p_{s1}$ (or $p_{s2}$) of the respective spring reservoir 16 (or 18), and actuated in the closing direction with the hydraulic pressure $p_{h1}$ (or $p_{h2}$) of the respective spring strut 2 (or 4) as well as an elastic closing force $F_F$ which is preferably produced by a compression spring not shown in the figures. Due to a minute, continued expansion movement of the spring struts 2 or 4, a minute expansion of the hydraulic medium stored therein and a rapid pressure drop occurs in the closed position of the expansion valve 28, so that the spring reservoir pressure $p_{s1},p_{s2}$ is larger than the spring strut pressure $p_{h1},p_{h2}$. The valve 28 opens due to this pressure differential because the opening force which depends on the respective pressure is larger than the total closing force which depends on the respective pressure and the closing spring. Once the valve 28 has been opened in this fashion, a pressure compensation occurs, and the valve 28 closes again once an equilibrium of pressure or a very minute pressure differential exists, because the closing force is then larger than the opening force. This process is repeated until the expansion movement of the spring strut 2, 4 has been concluded.

According to the invention, a bypass 40 that bypasses each of the expansion valves 28 and their valve elements 30 is provided (see, in particular, FIGS. 2–4). The bypass 40 is constructed in such a way that it ensures a pressure compensation between the sections of the flow path 26 arranged on both sides of the valve element 30 in a static condition in which essentially no flow is present; and that the bypass 40 essentially loses this pressure compensation function in the dynamic condition in which a flow is present. The bypass 40 is preferably constructed as a through channel 42 which extends through the valve element 30.

In order to realize the aforementioned function of the bypass 40, it may suffice if the bypass has such a small flow cross section that it is practically closed in regard to its pressure compensation once a flow is present due to the high flow resistance, which means, in other words, the bypass acts as if it would be closed. However, in the preferred application examples illustrated in the figures, the bypass 40 is additionally opened or closed via a locking device 44 which may be controlled in accordance with the respective flow and/or pressure ratios. This provides the substantial advantage that the control of the bypass 40 may also be performed in accordance with the flow and/or pressure ratios existing in the other, opposing spring strut 4/2 and its assigned spring reservoir 18/16 via a special control for the locking device 44, which will be explained in detail in the following. This type of control provides substantial advantages in regard to stabilizing the motor vehicle.

According to FIGS. 2 and 3, the locking device 44 acts upon the through channel 42 of the valve element 30 forming the bypass 40 in the closing direction of the valve element 30 with a locking tappet 46, meaning from the side of the valve element opposite the valve seat 32. The locking tappet 46 practically forms a valve seat with the outlet opening of the through channel 42, whereby the locking tappet 46 preferably has a valve collet-like end 48. Since this end 48 is arranged in that particular section of the flow path 26 in which the hydraulic pressure $p_{h1}$ or $p_{h2}$ of the spring strut 2 or 4 is present, the locking tappet 46, is on this side, acted on by this hydraulic spring strut pressure such that a force is created that has the tendency to move the locking tappet 46 away from the valve element 30 into its position in which it opens the bypass 40. The locking tappet 46 is, on its side opposite the valve element 30, sealed around its periphery and guided in a control pressure chamber 50, and the locking tappet is, or may, on this side, be actuated by a hydraulic control pressure $p_{st1}$ or $p_{st2}$, whereby the charging with this control pressure creates a force component which has the tendency to move the locking tappet 46 in the direction of the valve element 30 into a position in which it closes the bypass 40. If two spring struts 2, 4 cooperate as a pair, it is advantageous to use the hydraulic pressure of the other opposite spring strut 4 or 2 as the control pressure; the following equation applies: $p_{st1}=p_{h2}$ as well as $p_{st2}=p_{h1}$. In order to prevent an undesirable reaction of the locking device 44 from occurring during pressure differentials between the two hydraulic pressures $p_{h1}$ ($=p_{st2}$) and $p_{h2}$ ($=p_{st1}$) due to different weights F1, F2 (compared to FIG. 1), the invention suggests that the locking tappet 46 is, in static condition, pressure-compensated in such a way that it is always situated in the position in which it opens the bypass 40, whereby this pressure compensation is in a dynamic condition, namely if one of the two hydraulic pressures of the two spring struts 2, 4 changes dynamically, in other words once a flow is present, eliminated in such a way that the closing tappet is moved into the position in which it closes the bypass 40. This measure facilitates that the respective valve element 30 is acted on by a prestress force that acts in its closing direction and leads to a "harder" damping of the expansion flow which is present in this condition.

FIGS. 2 and 3 additionally indicate that an annular piston 52 is provided for the aforementioned pressure compensation of the locking tappet 46, whereby said annular piston encloses the locking tappet 46 like a sleeve. The locking tappet 46 is sealed around its periphery and may be moved relative to this annular piston. The annular piston 52 is also sealed around its periphery and guided in a movable fashion in the axial direction in a housing chamber 54, meaning in the moving direction of the locking tappet 46, so that the annular piston divides this housing chamber 54 into two partial chambers 56, 58, namely into a first partial chamber 56 arranged on the side of the annular piston 52 that faces the valve element 30, and is separated from the area of the flow path 26, which is acted on by the hydraulic pressure $p_{h1}$ or $p_{h2}$ of the spring strut 2 or 4 via a peripherally sealed lead-through 60 for the locking tappet 46, and a second partial chamber 58, which is arranged on the side of the annular piston 52 opposite the valve element 30 and separated from the control pressure chamber 50 via an additional sealed tappet lead-through 62. A prestressed compression spring 66 is, within the area of the second partial chamber 58, arranged between the annular piston 52 and an abutment 64 of the locking tappet 46 in such a way that the locking tappet 46 with the abutment 64 is in pressureless condition, situated in a limiting position at a distance from the valve element 30 and the bypass 40; and that the annular piston 52 is situated in a limiting position in which it reduces the volume of the first partial chamber 46 to a minimum. The invention additionally suggests that the locking tappet 46 and the annular piston 52 have at least approximately identical large cross-sectional surfaces (face surfaces that may be acted on by the pressure).

The variation illustrated in FIG. 2 suggests that the hydraulic pressure $p_{h2}$ ($p_{h1}$) of the one spring strut 4 (2) is stored (enclosed) in the first partial chamber 56 of the damping valve 22 (24) assigned to the other spring strut 2 (4) in a static condition of the motor vehicle or the two spring struts 2, 4. The first partial chamber 56 is, via a hydraulic connection 68, connected respectively with the other opposing spring strut, whereby a switching valve arrangement 70 is arranged in this connection 68. The switching valve arrangement illustrated in this application example consists of two nonreturn valves which lock in opposite directions and may be hydraulically unlocked by an unlocking pressure $p_E$. The area of the connection 68 situated between these two nonreturn valves is, or may be, connected with a pressure medium tank via an additional hydraulically unlocked nonreturn valve. The first partial chamber 56 may thus be acted on by the hydraulic pressure $p_{h2}$ ($p_{h1}$) of the respectively opposing spring strut 4 (2) by a suitable control of this switching valve arrangement 70. The connection 68 is subsequently closed, so that the pressure is stored in the first partial chamber 56. This leads to the result that the compression spring 66 exactly adjusts itself to a counterforce according to the principle of a "pressure scale" or a "power scale" due to the movement of the annular piston 52, whereby said counterforce retains the locking tappet 56 in the position in which it opens the bypass 40 via its abutment 64 independently from the pressures acting on the locking tappet 46 and the annular piston 52. This compensation position is only changed if one of the two hydraulic pressures of the spring struts is changed dynamically. The compression of the spring strut 4 (2) arranged on the opposite side leads to an increase in the control pressure $p_{st}$ as compared to the hydraulic pressure $p_{h1}$ ($p_{h2}$) which exists in the spring strut 2 (4) arranged on this side, so that the locking tappet 46 is moved in the direction toward the valve element 30 and thus closes the bypass 40 and charges the valve element 30 with a prestress force that results in an increased damping effect in the expansion direction on this side of the vehicle. If one drives around a curve such that the spring strut situated on the outer side is compressed, this measure facilitates that an expanding of the spring strut situated on the inner side of the curve is effectively prevented. The aforementioned measures thus pertain to a very effective stabilization against tilting movements of the motor vehicle.

In the variation illustrated in FIG. 2, it is advantageous if the second partial chamber 58 is automatically acted on by the hydraulic spring reservoir pressure $p_{s1}$ ($p_{s2}$) of the respective spring reservoir 16 (18). This development provides the particular advantage that the function of compression spring 66 is supplemented because the spring reservoir pressure actuates the annular piston 52 on this side. A simple and inexpensive compression spring 66 with only relatively minute spring force suffices for this purpose.

In the variation illustrated in FIG. 3, the first partial chamber 56 is continuously connected with the opposite spring strut 4 (2) via a hydraulic connection 72, but the hydraulic connection 82 has a smaller flow cross section (which may, for example, be realized by a throttle 74 arranged in the connection 72) such that practically the same pressure (control pressure) exists in the first partial chamber 56 as in control pressure chamber 50 in the static condition in which essentially no flow is present. However, once the control pressure is changed dynamically, this change in pressure propagates only in a delayed fashion toward the first partial chamber 56 due to the flow resistance of the hydraulic connection 72; this means that a "modified control pressure" $p_{st1}'$ ($p_{st2}'$) is present in this first partial chamber. The second partial chamber 58, is in this particular variation, inevitably acted on by the respective spring reservoir pressure $p_{s1}$, ($p_{s2}$). The locking tappet 46 is in this variation entirely pressure-compensated in the static condition and thus situated in the position at a distance from the valve element 30 in which it opens the bypass 40. Once the hydraulic pressure of the opposite spring strut, and thus also the control pressure of the damping valve is increased dynamically, this increased pressure first acts upon the control pressure chamber 50 such that the locking tappet 46 is moved into a position in which it actuates the valve element 30 with a prestress force and closes the bypass 40. The stabilization of the motor vehicle is again ensured in the previously described fashion.

The variation according to FIG. 2 may be designated as a "spring variation," while the variation according to FIG. 3 practically pertains to a "pressure variation."

In the particularly preferred application example of the invention illustrated in FIG. 4, the locking device 44 has a one-piece differential piston 80 which is freely movable in the axial direction such that it acts upon the through channel 42 of the valve element 30 forming the bypass 40 in the closing direction of the valve element 30, which menas, in other words, from the side opposite the valve seat 32. The end of the differential piston 80 facing the valve element is for this purpose constructed as a valve collet-like locking element 82 that practically forms a valve seat in the outlet opening of the through channel 42. The differential piston 80 consists of a tappet-like first stage 84 provided with the locking element 82 on one side, a piston-like second stage 88 which has a widened cross section and adjoins the first stage via the first annular stage 86, as well as a third stage 92 which has a reduced cross section and adjoins the aforementioned second stage via a second annular stage 90. Each of these three stages of the differential piston 80 has a cylindrical shape, whereby the second stage 88 has the largest cross section. The cross section of the first and third stages 84, 92 may be constructed identically, or slightly different. The second stage 88 is guided like a piston within a housing chamber divided into two partial chambers 96 and 98 via a peripheral seal 94. The first stage 84 extends from the first partial chamber 96 in the direction toward the valve element 30 through a housing lead-through that is sealed around its periphery, meaning into a portion of the flow path 26 connected with the spring strut 2/4 via a first hydraulic connection 100. The third stage 92, which is also sealed around its periphery, extends from the second partial chamber 98 into a control pressure chamber 102, whereby a control pressure connection 104 exits into said control pressure chamber. The control pressure chamber 102 is connected with the first partial chamber 96 via a channel 106 extending through the differential piston 80.

The second partial chamber 98 is connected with a hydraulic connection 110 which is to be connected with the spring reservoir 16/18, in the example illustrated via an external connecting line 108.

Due to this type of construction, surface $A_1$ of the first stage 84 which is effective on the side of the closing element 82 in the axial moving direction of the differential piston 80 is acted on by the hydraulic pressure $p_{h1}$ (or $p_{h2}$) of the spring strut 2 (4), which in turn creates an axial force that has the tendency to move the differential piston 80 away from the valve element 30 into the position in which it opens the bypass 40. A Surface $A_2$ of the third stage 92 formed by the face surface 112 facing the control pressure chamber 102 is acted on by the hydraulic control pressure $p_{st1}$ or $p_{st2}$ via the control pressure connection 104 such that a force component is created, which has the tendency to move the differential piston 80 into its position toward the valve element 30, in which it closes the bypass 40. If the two spring struts 2, 4 cooperate as a pair, it is advantageous to use the pressure of the other opposite spring strut 4 or 2 as the respective control pressure. The following equations apply: $p_{st1}=p_{h2}$ as well as $p_{st2}=p_{h1}$ (see FIG. 1).

In order to prevent an undesirable reaction of the locking device 44 from occurring if a pressure differential between the two hydraulic pressures $p_{h1}$ ($=p_{st2}$) and $p_{h2}$ ($=p_{st2}$) exists due to different forces F1, F2 acting upon the different sides of the motor vehicle (compared to FIG. 1), a pressure compensation via the second stage 88 of the differential piston 80 is provided in such a way that the differential piston 80 is, in the static condition, always situated in the position in which it opens the bypass 40. This pressure compensation is in a dynamic condition, namely if one of the two hydraulic pressures in the two spring struts 2, 4 is changed dynamically while a flow is present, eliminated such that the differential piston 80 is moved into the position in which it closes the bypass. This also causes the respective valve element 30 to be acted on by a prestress force $F_v$, which acts in the closing direction and results in a "harder" damping of the expansion flow that is present in this condition, so that the "crossover connection" provides an effective stabilization.

In order to realize this pressure compensation, it is suggested that the second stage 88 is on the sides of surface $A_3$, defined by the first annular stage 86, acted on by the respective hydraulic control pressure $p_{st1}$ or $p_{st2}$ and surface $A_4$, defined on the other side of the second stage 88 by the second annular stage 90, is acted on by the hydraulic pressure $p_{s1}$ or $P_{s2}$ of the respective spring reservoir 16 or 18.

Since the differential piston 80 is coupled with the valve element 30 in the closed position of the locking device 44, it should also be mentioned in regard to the pressure compensation that the valve element 30 is in its closed position actuated in the opening direction by the spring reservoir pressure via surface $A_5$, and in the closing direction actuated by the spring strut pressure via surface $A_6$, whereby the following formula always applies, due to the contact between the valve element and the valve seat 32: $A_5<A_6$.

In the preferred variation according to FIG. 4, it is very easily possible to design surfaces $A_1$–$A_4$ as well as $A_5$ and $A_6$ to be acted on by the expected pressure for the respective application purpose, correspondingly in order to ensure the desired comfort and stabilization characteristics in accordance with the respective load ratio. The following configuration may be particularly advantageous for a "road truck":

$$A_2<A_3; A_1<A_4; A_5>A_4.$$

For a different type of application, for example, for cranes or off-road vehicles, the following configuration would be advantageous:

$$A_2>A_3; A_1 \geq A_4; A_5 \geq A_4.$$

The invention is not limited to the illustrated and described application examples, but also includes all equally functioning variations according to the invention. The invention is not limited to the combination of characteristics defined in the independent claims, but may also be defined by any arbitrary combination of certain characteristics of all individual characteristics disclosed. This means that any individual characteristic of the independent claims may practically be omitted or replaced by an individual characteristic disclosed in a different text portion of the application. To that extent, the claims should only be viewed as a first attempt to formulate the invention.

I claim:

1. A wheel suspension system for motor vehicles, with at least one hydraulic spring strut (2/4) that consists of a cylinder (6) and a piston (8) guided inside the cylinder in a movable fashion in order to facilitate the compression and expansion movement of the strut, whereby at least a portion of a hydraulic medium is displaced into a hydropneumatic spring reservoir (16/18) during the compression movement of the spring strut (2/4), and said hydraulic medium flows back into the spring strut during the expansion movement; and whereby at least an expansion flow of the spring strut (2/4) is conveyed through a flow path (26) of a damping valve (22/24) and damped due to the fact that the flow path (26) is continuously closed and reopened in an alternating fashion by means of a valve element (30) once the expansion flow is present; characterized by a bypass (40) that bypasses the valve element (30) of the damping valve (22/24) and is provided with means to ensure a pressure compensation between sections of the flow path (26) arranged on both sides of the valve element in response to the static condition in which essentially no flow is present and to operate the bypass (40) to substantially lose this pressure compensation function in response to the dynamic condition in which a flow is present.

2. Suspension system according to claim 1, characterized by the fact that the bypass (40) has a flow cross section that is reduced such that it is substantially closed in regard to its pressure compensation function due to high flow resistance once a flow is present, whereby the bypass (40) is constructed as a through channel (42) extending through the valve element (30).

3. Suspension system according to claim 1, characterized by the fact that the valve element (30) cooperates with a valve seat (32) as nonreturn valve in order to open and close the flow path (26), whereby the valve element (30) is, on one side, actuated in the opening direction with the hydraulic pressure ($p_{s1}/p_{s2}$) of the spring reservoir (16/18) and, on the other side, actuated in the closing direction with the hydraulic pressure ($p_{h1}/p_{h2}$) of the spring strut (2/4) as well as with an elastic closing force ($F_F$) in such a way that the valve element (30) automatically closes and opens during the expansion flow through the flow path (26), due to the fact that the valve element closes if an equilibrium of pressure or a certain pressure differential exists between the two hydraulic pressures ($p_{s1}$, $p_{h1}/p_{s2}$, $p_{h2}$); and that said valve element opens if the pressure differential increases in the closed position due to a drop of the pressure ($p_{h1}/p_{s2}$) of the spring strut (2/4) once a certain pressure differential has been reached.

4. Suspension system according to claim 1, characterized by the fact that the bypass (40) is closed or opened by a locking device (44) that may be controlled in accordance with respective flow or pressure ratios on both sides of the valve element.

5. Suspension system according to claim 4, characterized by the fact that the locking device (44) may be acted on by a hydraulic control pressure ($p_{s1}/p_{s2}$) in order to control the bypass (40), whereby two spring struts (2,4) and their respective spring reservoirs (16,18) and damping valves (22,24) arranged in a motor vehicle cooperate in pairs, due to the fact that the hydraulic pressure ($p_{h2}/p_{h1}$) of the one spring strut (4/2) arranged on the opposite side of the motor vehicle is used as the control pressure ($p_{st1}/p_{st2}$) for the damping valve (22/24) of the other spring strut (2/4).

6. Suspension system according to claim 4, characterized by the fact that the locking device (44) charges the valve element (30) in the closing direction with a prestress force ($F_v$), which depends on the pressure ratio in the position in which it closes the bypass (40).

7. Suspension system according to claim 4, characterized by the fact that the locking device (44) acts upon a through channel (42) of the valve element (30) forming the bypass (40) in the closing direction of the valve element (30) via a locking tappet (46).

8. Suspension system according to claim 7, characterized by the fact that the locking tappet (46) which is, on the side facing the valve element (30), acted on by the hydraulic pressure ($p_{h1}/p_{h2}$) of the spring strut (2/4), is guided in a control pressure chamber (50) and sealed around its periphery on the side opposite the valve element (30); and that said locking tappet is on this side acted on by a hydraulic control pressure ($p_{s1}/p_{s2}$).

9. Suspension system according to claim 7, characterized by the fact that the locking tappet is, in the static condition, pressure-compensated in such a way that it is situated in a first position in which it opens the bypass (40);

that said pressure compensation is in the dynamic condition, in which one of the two hydraulic pressures ($p_{h1}/p_{h2}$) of the two spring struts (2,4) is changed dynamically, eliminated such that the locking tappet (46) is moved into a second position in which it closes the bypass (40); and that the valve element (30) is, during this dynamic condition, acted on by a prestress force ($F_v$) which acts in its closing direction.

10. Suspension system according to claim 7, characterized by the fact that the locking tappet (46) is sealed around its periphery and guided through a sleeve-like annular piston (52) such that it may be moved relative to the same, whereby the annular piston (52) is in turn sealed around its periphery and guided such that it may be moved axially in a housing chamber (54); and that this housing chamber (54) is divided into two partial chambers (56,58), namely into a first partial chamber (56) which is situated adjacent to the area of the flow path (26) that is acted on by the hydraulic pressure ($p_{h1}/p_{h2}$) of the spring strut (2/4) via a peripherally sealed leadthrough (60) for the locking tappet (46), as well as a second partial chamber (58) which is connected with the control pressure chamber (50) via a sealed tappet lead-through (62), whereby a prestressed compression spring (66) is arranged within the area of the second partial chamber (58) between the annular piston (52) and an abutment (64) of the locking tappet (46) in such a way that the locking tappet (46) with the abutment (64) is, in a pressureless condition, situated in a limiting position at a distance from the valve element (30) and the bypass (40), and the annular piston (52) is situated in a limiting position which reduces the volume in the first partial chamber (46) to a minimum.

11. Suspension system according to claim 10, characterized by the fact that the hydraulic pressure ($p_{h2}/p_{h1}$) of a second spring strut (4/2) is stored in the first partial chamber (56) of the damping valve (22/24) of a first spring strut (2/4) in the static condition of the first and second spring struts (2,4).

12. Suspension system according to claim 10, characterized by the fact that the first partial chamber (56) is continuously connected with the control pressure chamber (50) via a throttle (74).

13. Suspension system according to claim 10, characterized by the fact that the second partial chamber (58) is acted on by the hydraulic pressure ($p_{s1}/p_{s2}$) of the spring reservoir (16/18).

14. Suspension system according to claim 10, characterized by the fact that the cross-sectional surfaces of the locking tappet (46) and the annular piston (52) which may be acted on by a pressure in the moving direction have at least approximately the same size.

15. Suspension system according to claim 4, characterized by the fact that the locking device (44) is provided with a differential piston (80) that is freely movable in the axial direction in order to open and close the bypass (40) and pressure-compensated in such a way that the locking device (40) has a tendency to open in the static condition in which essentially no flow is present, and a tendency to close in the dynamic condition in which the pressure ratios are changed due to a flow.

16. Suspension system according to claim 15, characterized by the fact that the differential piston (80) consists of a first stage (84) that is provided with a tappet-like closing element (82) that cooperates with the bypass (40); a second stage (88) which has a widened cross section and adjoins the aforementioned first stage via a first annular stage (86); and a third stage (92) which has a reduced cross section and adjoins the aforementioned second section via a second annular stage (90), whereby the first stage (84) is on the side of the closing element (82), acted on by the hydraulic pressure ($p_{h1}/p_{h2}$) of the spring strut (2/4), the second stage (88) is, on the side of the first annular stage (86), acted on by the hydraulic control pressure ($p_{st1}/p_{st2}$) and, on the side of the second annular stage (90), acted on by the hydraulic spring reservoir pressure ($p_{s1}/p_{s2}$); and the third stage (92) is, on its face surface (112) opposite the first and second stage (84,88), acted on by the control pressure ($p_{st1}/p_{st2}$).

17. Suspension system according to claim 15, characterized by the fact that a surface ($A_1$) that is acted on by a pressure on the side of the closing element (82) of a first stage (84) of the differential piston (80) is smaller than a surface ($A_4$) of a second annular stage (90) of the differential piston (80); or that the size of a surface ($A_2$) of the face surface (112) of a third stage (92) of the differential piston (80) is smaller than a surface ($A_3$) of a first annular stage (86) of the differential piston (80); or that the surface $A_4$ of a second annular stage (90) of the differential piston (80) is smaller than a surface ($A_5$) of the valve element (30) of the expansion valve (28) which is acted on by a pressure in the opening direction, whereby the surface ($A_5$) of the valve element (30) which is acted on by a pressure in the opening direction in the closed condition of the expansion valve (28) is smaller than its opposite surface ($A_6$), which is actuated in the closing direction.

18. Suspension system according to claim 1, characterized by a nonreturn valve (36) which acts opposite the flow direction and is hydraulically switched in parallel with a valve (28), formed by the valve element (30) and a valve seat (32), whereby said nonreturn valve substantially opens without a throttling effect once a compression flow from the spring strut (2/4) to the spring reservoir (16/18) is present, and said nonreturn valve closes once a expansion flow is present.

19. Damping valve (22,24) to be used in connection with a wheel suspension system with at least one hydraulic spring strut, whereby at least a portion of a hydraulic medium is displaced into a spring reservoir, with a valve element (30) which is arranged in a flow path (26) for the hydraulic medium and constructed in such a way that a flow path (26) is continuously closed and reopened in an alternating fashion by the valve element (30) during a flow of the hydraulic medium in order to produce a damping effect, characterized by a bypass (40) which bypasses the valve element (30) and is provided with means to ensure a pressure compensation between sections of the flow path (26) arranged on both sides of the valve element (20) in response to the static condition in which essentially no flow is present and to operate said bypass (40) is operative to essentially lose this pressure compensation function in the dynamic condition in which a flow is present.

20. Damping valve according to claim 19, characterized by a locking device (44) which opens or closes the bypass (40) in accordance with the respective flow and/or pressure ratios.

21. Damping valve according to claim 20, characterized by the fact that the locking device (44) controlled in accordance with respective pressure ratios on both sides of the valve element (30) and acting upon a through channel (42) of the valve element (30) forming the bypass (40) in the closing direction of the valve element (30) via a locking tappet (46).

22. Damping valve according to claim 20, characterized by the fact that the locking device (44) is provided with a differential piston (80) which is freely movable in the axial direction in order to open and close the bypass (40) and pressure-compensated in such a way that the locking device (44) has a tendency to open in the static condition in which essentially no flow is present, and a tendency to close in the dynamic condition in which the pressure ratio changes due to a flow.

23. Damping valve according to claim 22, characterized by the fact that the differential piston (80) consists of a first stage (84) which is provided with a tappet-like closing element (82) that cooperates with the bypass (40);

a second stage (88) which has a widened cross section and adjoins the aforementioned first stage via a first annular stage (86); and a third stage (92) which has a reduced cross section and adjoins the aforementioned second stage via a second annular stage (90), whereby the first stage (84) is, with the side of the closing element (82), arranged in the area of the flow path (26) which is connected via a first hydraulic connection (100);

the second stage (88) separates a first partial chamber (96) arranged on the side of the first annular stage (86) from a second partial chamber (98) arranged on the side of the second annular stage (90); and the third stage (92) is guided within a control pressure chamber (102), whereby the control pressure chamber (102) and the first partial chamber (96) are connected with a control pressure connection (104), and the second partial chamber (98) is connected with a second hydraulic connection (110).

24. Damping valve according to claim 23, characterized by the fact that the control pressure connection (104) exits into the control pressure chamber (102), whereby the control pressure chamber (102) is connected with the first partial chamber (96) via at least one channel (106) extending through the differential piston (80).

25. Damping valve according to claim 21, characterized by the fact that the bypass (40) is constructed as a through channel (42) extending through the valve element (30), whereby the locking device (44) acts against the through channel (42) of the valve element (30) in the closing direction in order to close the bypass (40) such that a prestress force (F~) is produced.

\* \* \* \* \*